UNITED STATES PATENT OFFICE.

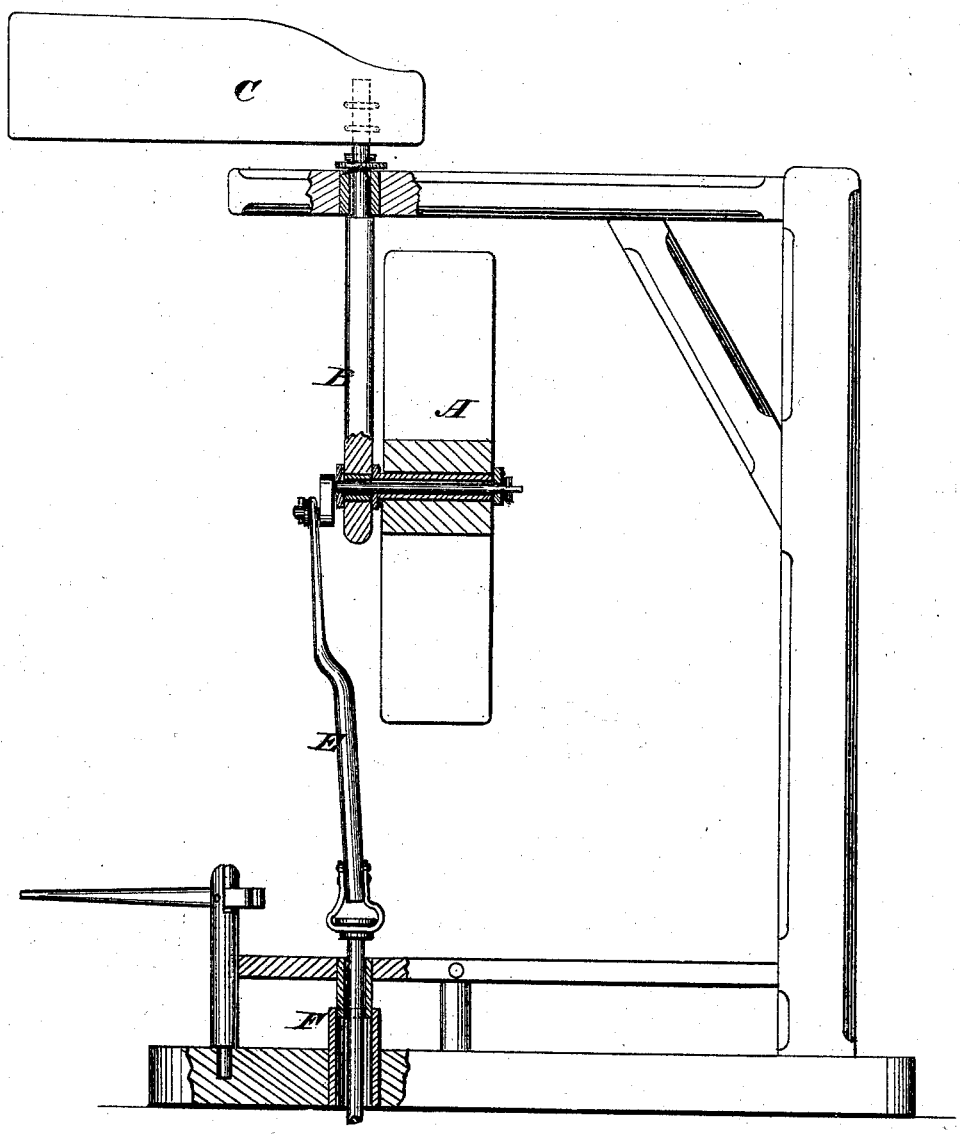

TIMOTHY C. GUTHERY, OF FREEDOM, INDIANA.

IMPROVEMENT IN WIND-POWERS.

Specification forming part of Letters Patent No. 172,015, dated January 11, 1876; application filed July 17, 1875.

*To all whom it may concern:*

Be it known that I, TIMOTHY C. GUTHERY, of Freedom, Owen county, Indiana, have invented a new and Improved Wind-Power, of which the following is a specification:

The invention relates to an improvement upon the wind-wheel covered by Patent No. 91,457, and consists in mounting the wheel upon a shaft having its bearings in a rotating bar or hanger, to whose upper end a vane is rigidly attached, as hereinafter described.

The drawing is a sectional elevation of my improved apparatus.

A is the vertical wind-wheel; B, the vertical rotating shaft or hanger, in which the crank-shaft of said wheel has its bearings; and C, the vane, which is rigidly attached to the end of said hanger, which projects above the horizontal beam of the frame-work of the apparatus.

As compared with others of its class this invention has the following advantages: The apparatus is composed of a less number of parts; said parts occupy smaller space; the wind has freer access to the wheel proper; the frame-work of the apparatus is lighter; the first cost of the apparatus and of erection thereof is less; and its greater simplicity renders it less liable to get out of order or to be damaged by storms.

What I claim is—

The wheel A, mounted upon a shaft having its bearings in the vertical rotating shaft or hanger B, and the vane C rigidly attached to the upper end of said shaft or hanger, above its point of support in the frame-work, all combined as shown and described, for the purpose specified.

TIMOTHY C. GUTHERY.

Witnesses:
J. A. McINDOO,
WILLIAM CHILDRESS.